United States Patent
Takagi et al.

(10) Patent No.: US 7,840,128 B2
(45) Date of Patent: Nov. 23, 2010

(54) IMAGE-BLUR COMPENSATING DEVICE AND IMAGE PICKUP APPARATUS

(75) Inventors: Hideo Takagi, Tokyo (JP); Tatsuyuki Takahashi, Kanagawa (JP); Toshifumi Takaoka, Chiba (JP); Tomoya Takei, Tokyo (JP)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 12/141,355

(22) Filed: Jun. 18, 2008

(65) Prior Publication Data
US 2009/0034950 A1 Feb. 5, 2009

(30) Foreign Application Priority Data
Aug. 2, 2007 (JP) ............................. 2007-202251

(51) Int. Cl.
G03B 17/00 (2006.01)
(52) U.S. Cl. ...................................... 396/55; 348/208.7
(58) Field of Classification Search ................... 396/55; 348/208.7, 352; 318/561
See application file for complete search history.

(56) References Cited

U.S. PATENT DOCUMENTS

| | | | | |
|---|---|---|---|---|
| 6,034,499 | A | * | 3/2000 | Tranovich .................... 318/650 |
| 2006/0204233 | A1 | * | 9/2006 | Miyamoto ...................... 396/55 |
| 2007/0009244 | A1 | | 1/2007 | Takahashi |
| 2007/0122129 | A1 | * | 5/2007 | Sakamoto et al. .............. 396/52 |
| 2008/0151096 | A1 | * | 6/2008 | Okada .......................... 348/345 |
| 2009/0224716 | A1 | * | 9/2009 | Vig et al. ...................... 318/550 |

FOREIGN PATENT DOCUMENTS

| | | |
|---|---|---|
| JP | 10-260445 | 9/1998 |
| JP | 2004-46234 | 2/2004 |
| JP | 2007-17874 | 1/2007 |
| JP | 2007-121518 | 5/2007 |

\* cited by examiner

*Primary Examiner*—Melissa J Koval
*Assistant Examiner*—Autumn Parker
(74) *Attorney, Agent, or Firm*—Oblon, Spivak, McClelland, Maier & Neustadt, L.L.P.

(57) ABSTRACT

An image-blur compensating device includes an optical component configured to compensate blur in an image, an actuator driving the optical component, a displacement detector detecting a position of the optical component changed by the actuator, an angular velocity detector detecting an angular velocity applied from outside, and a target displacement calculator calculating a driving amount when the actuator has driven the optical axis changing unit based on the angular velocity detected by the angular velocity detector and the position detected by the displacement detector. The target displacement calculator then obtains, as a result of compensating an amount of influence on the position of the optical component, a driving amount when driving the actuator based on the calculated driving amount. The image-blur compensating device further includes a driver driving the actuator based on the driving amount calculated by the target displacement calculator.

10 Claims, 11 Drawing Sheets

IMAGE-BLUR COMPENSATING DEVICE AND IMAGE PICKUP APPARATUS

CROSS REFERENCES TO RELATED APPLICATIONS

The present invention contains subject matter related to Japanese Patent Application JP 2007-202251 filed in the Japanese Patent Office on Aug. 2, 2007, the entire contents of which being incorporated herein by reference.

BACKGROUND OF THE INVENTION

1. Field of the Invention

The invention relates to an image-blur compensating device configured to compensate blurred images due to, for example, unintentional movements of a user's hand holding a so-called image-blur compensation image pick up apparatus, and also to an image pickup apparatus having the image-blur compensating device such as digital still cameras or camcorders.

2. Description of the Related Art

When a user unintentionally moves her/his hand in capturing images using a related art digital still camera or camcorder, the captured images are blurred in response to hand trembling or wobbling, thereby significantly deteriorating the quality of the captured images. There are roughly two technologies to compensate the image-blur of this kind, namely, optical compensation technology, and electrical compensation technology in which the blurred images captured by an imager are electrically compensated.

In the optical compensation technology, an optical component is placed in a point of an optical path of an image light that passes thorough an optical pickup lens to reach an imager so that an optical axis of the image is compensated. As a result, the image-blur resulting from unintentional hand movements that have affected the image pickup device is compensated to obtain a stabilized image.

FIG. 1 is a block diagram illustrating a configuration of an image compensating device according to the related art image pickup apparatus. The image pickup apparatus includes an optical system for capturing images having a main lens 41, a shift lens 42, and a focus lens 43 that are arranged along an optical axis Z, and light of images is incident on an imaging surface of an image pickup device 44 via the optical system having these lenses. The image pickup device 44 then converts the incident light of the images into an electrical image signal. The shift lens 42 is utilized for compensating a blurred image. The shift lens 42 can be tilted in a pitch angle direction by driving a pitch actuator 32, and can also be tilted in a yaw angle direction by driving a yaw actuator 36. The pitch and yaw angles are used for tilting the shift lens 42 horizontally, and formed with two mutually different directions intersecting at right angles to an optical axis Z and having an angle of 90 degrees therebetween. The pitch and yaw angles of the shift lens 42 are detected by pitch and yaw position sensors 33, 37, detected output signals of which are converted into digital data by analog-to-digital converters 34, 38, and the digitized data are supplied to a servo calculator 22.

The image pickup apparatus also includes an angular velocity sensor 11 detecting an angular velocity applied from outside to the image pickup apparatus in a pitch angle direction, and a yaw velocity sensor 14 detecting an angular velocity applied from outside to the image pickup apparatus in a yaw angle direction. The "unintentional movements" affected on the image pickup apparatus can be detected by the angular velocity applied to the two directions, namely, the pitch angle direction and yaw angle direction.

The output signal detected by the pitch angle sensor 11 is amplified by an amplifier 12, digitized by an analog-to-digital converter 13, and then supplied to an image blur compensation calculator 21 in a control unit 20. The output signal detected by a yaw angle sensor 14 is amplified by an amplifier 15, digitized by an analog-to-digital converter 16, and then supplied to the image blur compensation calculator 21. The image blur compensation calculator 21 calculates compensation amounts of pitch angle and yaw angles, and transmits the obtained compensation amounts to the servo calculator 22.

The servo calculator 22 calculates target pitch and yaw angles based on the compensation amounts of pitch and yaw angles supplied thereto, and then generates pitch and yaw driving signals resulted from the obtained pitch and yaw angles. The pitch and yaw driving signals are supplied to digital-to-analog converters 31, 35, respectively. The driving signals converted by the digital-to-analog converters 31, 35 are supplied to the pitch actuator 32 and the yaw actuator 36 to thereby set the pitch and yaw angles of the shift lens 42 in compliance with the obtained driving signals.

FIG. 2 is a block diagram illustrating a more detailed configuration example of pitch and yaw angle settings for the image compensating device according to the related art. A pitch angle compensation amount Tp output by the control unit 20 calculating the image compensation amount is supplied to a subtracter 51, so that the difference between the supplied pitch angle compensation and a current pitch angle is detected. The detected difference is supplied to a PID control operation unit 52 to generate a driving signal for the pitch actuator, and the generated driving signal is supplied to the pitch actuator 32 via the digital-to-analog converter 31. The pitch portion of the shift lens driven by the supply of the driving signal is detected by the pitch position sensor 33, and the detected pitch position of the sensor 33 is converted by the analog-to-digital converter 34 via an amplifier 53. The converted pitch position is supplied to the subtracter 51 to calculate the difference between the pitch angle compensation amount Tp and the converted pitch position supplied.

A yaw angle compensation amount Ty output by the control unit 20 is supplied to a subtracter 54, so that the difference between the supplied yaw angle compensation value and a current yaw angle is detected. The detected difference is supplied to a PID control operation unit 55 to generate a driving signal for the yaw actuator, and the generated driving signal is supplied to the yaw actuator 36 via the digital-to-analog converter 35. The yaw portion of the shift lens driven by the supply of the driving signal is detected by the yaw position sensor 37, and the detected yaw position of the sensor 37 is converted by the analog-to-digital converter 56 via an amplifier 38. The converted yaw position is supplied to the subtracter 54 to calculate the difference between the pitch angle compensation amount Tp and the converted yaw position supplied.

The pitch angle and yaw angle of the shift lens are respectively compensated in compliance with the angular velocity applied to the image pickup apparatus in this manner to thereby compensate the image blur. Japanese Unexamined Patent Application Publication No. 2007-17874 discloses an example of an image-pickup apparatus having a shift lens of this kind.

SUMMARY OF THE INVENTION

There frequently occurs interference between actuators driving a shift lens and sensors in such an image pickup apparatus having the sensors detecting the pitch and yaw angles. An example of the actuators for the shift lens includes an electromagnetic actuator utilizing a coil and a magnet. This type of actuator is configured to drive the actuator at high rates to move the shift lens using an electromagnetic field generated by voltage applied to the coil of the actuator, thereby adjusting a position of the shift lens to generate stabilized images. The position sensors detecting pitch and yaw angles are generally configured to include halls element that detect relative positions to the magnet for detecting positions.

Since either of the electromagnetic actuator drives and position sensor detects the shift lens electromagnetically, the magnetic field generated by the electromagnetic actuator may interfere with the hall element as the position sensor, thereby reducing the accuracy in detecting positions. If the image pickup apparatus includes the electromagnetic actuators and the position sensors that can be arranged so as to leave a sufficient distance therebetween to have no interference, the accuracy in detecting positions will not decrease. However, since recent trend in image pickup apparatus such as camcorders and electronic digital still cameras seems to reduce size thereof, the notion of leaving a sufficient distance between the actuator and the sensor may be accepted in production. Specifically, when the position sensor detects positions in the presence of the electromagnetic field effects generated by the electromagnetic actuator, the accuracy in compensating image-blur will be reduced due to decrease in the detection accuracy of the position sensor.

Thus, an embodiment of the invention intends to provide an image pickup apparatus having little interference between the actuators and the position sensors so as to compensate image-blur accurately.

An embodiment of the invention includes an actuator configured to drive an optical axis changing unit that optionally changes an optical axis of an image pickup lens system, and a displacement detector configured to detect a position of the optical axis changed by the optical axis changing unit driven by the actuator. According to the embodiment of the invention, a driving amount of the actuator can be calculated based on an angular velocity applied from outside detected by an angular velocity detector and the position detected by the displacement detector. When calculating a driving amount of the actuator, a target displacement calculator calculates an amount of influence by the actuator on the position detected by the displacement detector, and drives the actuator based on the driving amount of the actuator obtained by the target displacement calculator.

As a result, the target displacement calculator calculates, as a result of compensating the amount of influence based on the position of the actuator on the position detected by the displacement detector, and compensates the amount of influence so as to eliminate the influence from the actuator, thereby accurately compensating the image-blur of images.

In the embodiments of the invention, the target displacement calculator calculates, as a result of compensating the amount of influence based on the position of the actuator on the position detected by the displacement detector, and compensates the amount of influence so as to remove the influence from the actuator, thereby accurately compensating the image-blur of images. Thus, image-blur is accurately compensated even though the actuator and the displacement detector are adjacently arranged, and an apparatus having an image-blur compensating mechanism can be reduced in size.

DESCRIPTION OF THE PREFERRED EMBODIMENTS

A first embodiment of the invention will be described below with reference to FIG. 3 to FIG. 8. An image pickup apparatus according to the embodiment of the invention includes an image-blur compensating device configured to compensate an image-blur resulted from unintentional hand-movements in capturing an image. Various image pickup apparatuses such as camcorders, digital still cameras, and camera phone terminals can employ such an image-blur compensating device. For example, a digital camera 80 or a digital camera 90, an external appearance of which is shown by phantom lines in FIG. 7 or in FIG. 8 described later, can employ the image compensating device.

Figure 4:
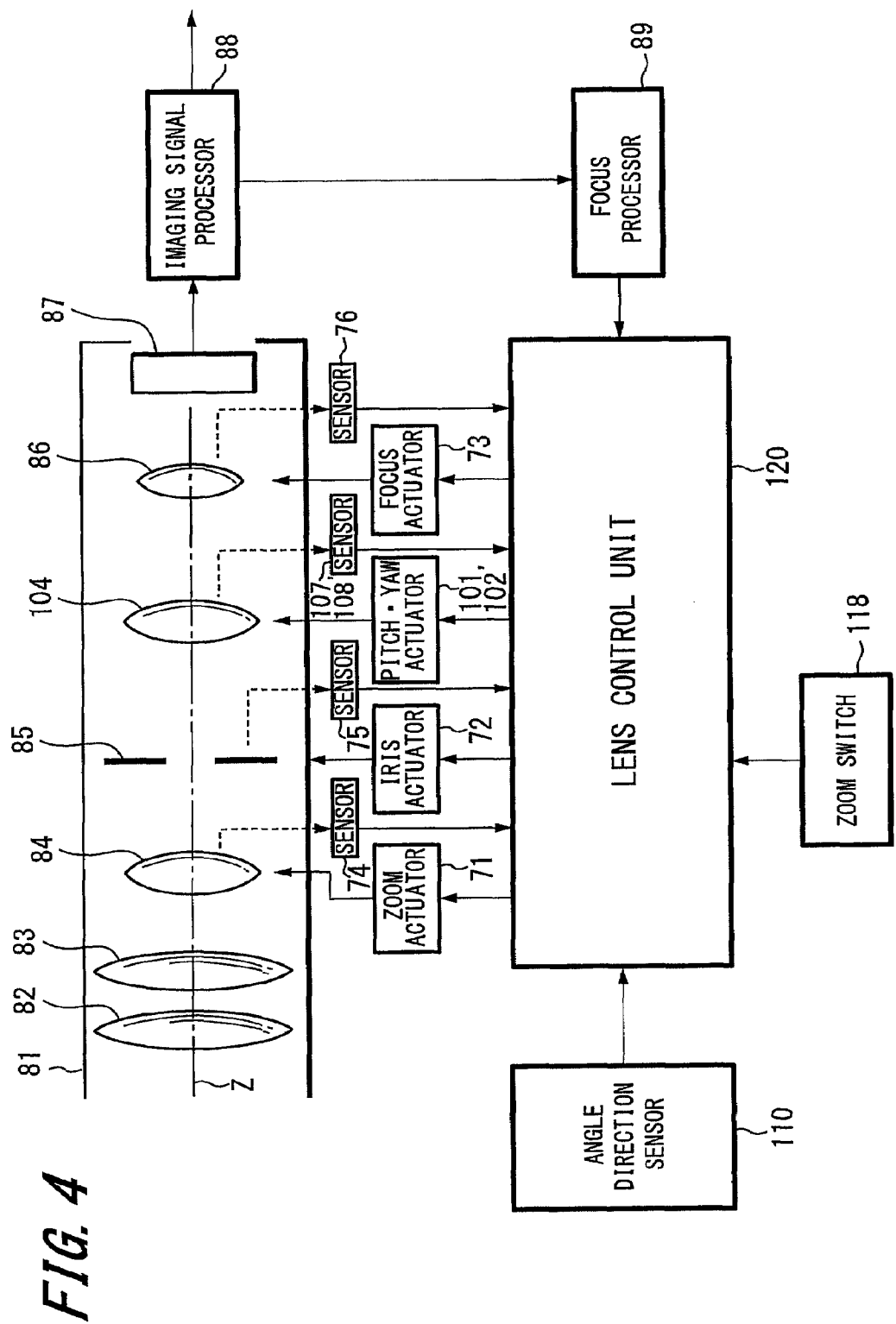
FIG. 4 shows a block diagram illustrating an overall configuration example of the image pickup apparatus according to the first embodiment of the invention.

First, an overall configuration of the image pickup will be described with reference to FIG. 4. The image pickup apparatus includes a lens barrel 81 configured to capture images including fixation lenses, a zoom lens 84, a shift lens 104, a focus lens 86, and an imager 87 therein that are all aligned along the optical axis Z in this order. An image light that passes through these lenses is incident on an imaging surface of the imager 87. In the image pickup apparatus, an iris (aperture mechanism) 85 is placed between the zoom lens 84 and the shift lens 104. Further, lenses other than fixation lenses 82, 83 are moved by driving actuators, and sensors detect positions of the lenses moved by the actuators. The actuators and sensors will be described later. One example of the order of the lenses and iris arrangements is shown in FIG. 4, and each of the lenses may include a plurality of lenses.

Various types of imagers may be employed as the imager 87, including imagers having a charge coupled device (CCD) or a complementary metal oxide semiconductor (CMOS). The image light incident on the imaging surface of the imager 87 is converted into electric signals per pixel, the converted electric signal is transmitted to an image processor 88 per frame to carry out processing, thereby generating an appropriate imaging signal.

The imaging signal obtained by the image processor 88 is transmitted to a focus processor 89. The focus processor 89 detects a high-frequency component of a luminance signal contained in the image signal to detect the adjusted focus state, and the detected data of the adjusted focus state is transferred to a lens control unit 120. The lens control unit 120 indicates an arithmetic processing unit configured to control positions of the lenses by driving actuators therefor. The lens control unit 120 controls the positions the lenses based on zoom positions indicated via the operation of a zoom switch 118, the adjusted focus state supplied from the focus processor 89, and angular velocity supplied from an angular velocity sensor 110.

The specific configurations of the actuators and sensors for the lenses will be described herein. The zoom lens 84 configured to adjust an angular field of view captured is arranged along the optical axis Z, and moved by a zoom actuator 71. A sensor 74 detects the moved position of the zoom lens 84. The actuator 71 drives the zoom lens 84 based on the instructions given by the lens control unit 120, and the position of the zoom lens detected by the sensor 74 is transferred to the lens control unit 120. The lens control unit 120 adjusts the angular field of view using the zoom lens 84 based on a state of the zoom switch 118 operated by a user.

An iris actuator 72 controls an amount of incoming rays of the image light to an iris 85, and a sensor 75 detects the resulting amount of rays. The actuator 72 drives the iris 85 based on the instructions given by the lens control unit 120, and the data indicating the position of the zoom lens detected by the sensor 75 is transferred to the lens control unit 120. The lens control unit 120 determines the amount of incoming rays adjusted by the iris 85 based on the amount of incoming rays or imaging conditions.

A pitch actuator 101 and a yaw actuator 102 can move the shift lens 104 in pitch angle and yaw angle directions, and sensors 107, 108 individually detect the moved positions based on the pitch angle and the yaw angle. The actuators 101, 102 each drive the shift lens 104 based on the instructions given by the lens control unit 120, and the data indicating the shift position detected by the sensors 107, 108 is transferred to the lens control unit 120. The shifted amounts of the shift lens 104 in the pitch angle and yaw angle directions are determined based on the angular velocities of the pitch angle and yaw angle applied from outside to the image pickup apparatus.

A focus actuator 73 can move the focus lens 86 for adjusting a focus along the optical axis Z, and a sensor 76 detects the moved position of the focus lens 86. The actuator 73 drives the focus lens 86 based on the instructions given by the lens control unit 120, and the data indicating the position of the focus lens detected by the sensor 76 is transferred to the lens control unit 120. The lens control unit 120 adjusts a focus on the image to obtain an in-focus state by driving the focus lens 86 based on data of the adjusted focus state supplied from a focus processor 89. Alternatively, the lens control unit 120 adjusts the focus on the image by driving the actuator 73 based on an operational state of a focus adjusting ring actuator 73 utilized for manually adjusting the focus on the image.

Figure 5:
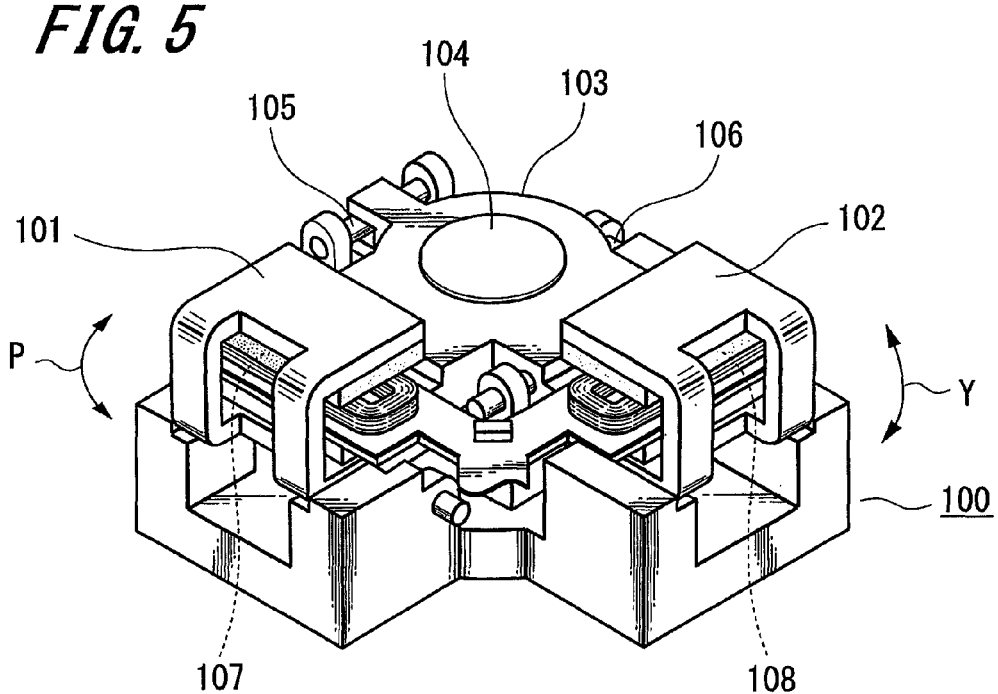
FIG. 5 shows a perspective view illustrating a configuration example of the shift lens driver according to the first embodiment of the invention.

Next, a configuration example of a shift lens unit 100 supporting the shift lens 104 that compensates an image-blur will be described with reference to FIG. 5. As shown in FIG. 5, in the shift lens unit 100, the shift lens 104 is supported with a lens supporting frame 103. The lens supporting frame 103 oscillatably supports the shift lens 104 along a yaw angle direction supporting shaft 105, and also oscillatably supports the shift lens 104 along a pitch angle direction supporting shaft 106. The pitch and yaw angles are two mutually different angles by 90 degrees, to the directions of which a horizontal surface of the lens supporting frame 103, namely, a shift lens supporting surface intersecting at right angles to the optical axis Z can be tilted. The pitch angle P and yaw angle Y are illustrated in FIG. 5. The shift lens 104 is shifted in the directions of the pitch angle P and yaw angle Y to refract the optical axis Z, thereby compensating the image-blurring.

An angular position of the lens supporting frame 103 in the pitch angle P direction is adjusted by the pitch actuator 101, and an angular position thereof in the yaw angle Y direction is adjusted by the yaw actuator 102. The pitch actuator 101 and yaw actuator 102 each include a coil and a yoke sandwiching the yoke. In the actuators 101, 102, angular positions of the pitch and yaw angles are determined based on magnetic fields induced from voltage applied to the coils. The angular position of the pitch angle is detected by the pitch position sensor 107 mounted closed to the pitch actuator 101. The angular position of the yaw angle is detected by the yaw position sensor 108 mounted closed to the yaw actuator 102. The angular position sensors 107, 108 are located inside the shift lens unit 100, and both may not be observed from an external appearance thereof.

Figure 6A:
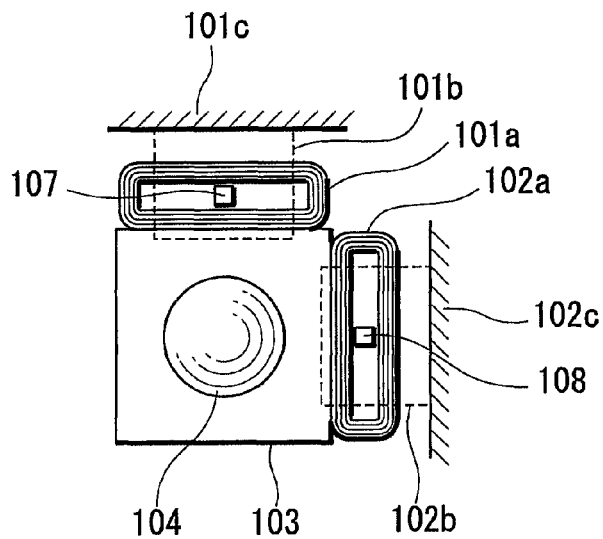
FIGS. 6A, 6B each show an explanatory diagram schematically illustrating a structure of the shift lens according to the first embodiment of the invention.
Figure 6B:
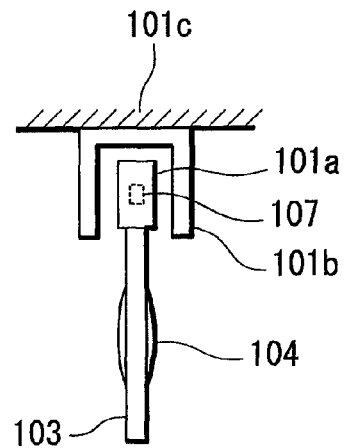

FIGS. 6A, 6B are schematic diagrams each illustrating a structure of the shift lens unit 100 shown in FIG. 5.

FIG. 6A illustrates the shift lens unit 100 viewed from the direction along the optical axis, and FIG. 6B illustrates the shift lens 104 sectioned along the thickness direction thereof. FIGS. 6A, 6B are schematic diagrams illustrating outlined arrangements of the actuators 101, 102, and the yaw angle direction supporting shaft 105 and pitch angle direction supporting shaft 106 in FIG. 5 are omitted. Relative positions of the coil 101*a* mounted the lens supporting frame 103 and a fixed portion of the yoke 101*b* are determined based on the voltage applied to the coil 101*a*, so that the angular position in the pitch angle direction is adjusted as illustrated in FIG. 6A. As shown in FIG. 6B, the yoke 101*b* is configured to sandwich the coil 101*a*. A coil 102*a* mounted the lens supporting frame 103 and a fixed portion of a yoke 102*b* each have similar configurations as the coil 101*a* and the yoke 101*b* described above, and relative positions of the coil 102*a* mounted the lens supporting frame 103 and a fixed portion of the yoke 102*b* are determined based on the voltage applied to the coil 102*a*, so that the angular position in the yaw angle direction is adjusted. The pitch position sensor 107 and yaw position sensor 108 are, for example, located close to sides of the lens supporting frame 103 in the vicinities of the coils 101*a*, 102*a* respectively forming the actuators 101, 102. The pitch position sensor 107 and yaw position sensor 108 are, for example, formed of hall elements, so that relative positions of the sensors 107, 108 to respective magnets, not shown, placed on portions of the yokes fixed to the shift lens unit 100 are determined based on detected magnetic fields generated from the magnets. Note that hall elements are arranged on the portions of the yokes fixed to the shift lens unit 100 whereas the magnets are movably arranged on portions of the yokes. The position detecting sensors other than the all elements may alternatively be used.

Figure 7:
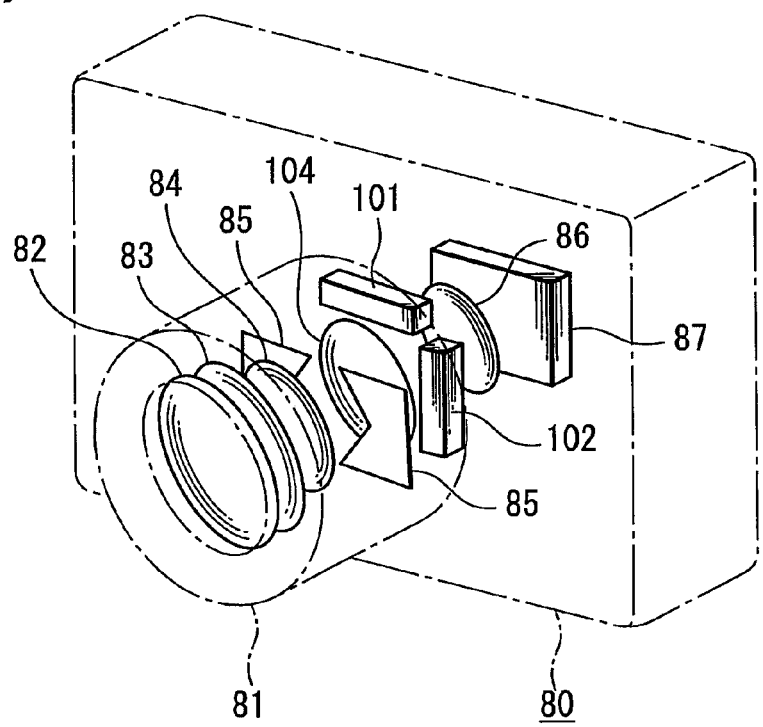
FIG. 7 shows a perspective view illustrating one example of the image pickup apparatus to which an embodiment of the invention is applied.

The components of the optical system including the shift lens unit 100 having the aforementioned configuration may be utilized for an image pickup apparatus (digital camera) 80 having the external configuration illustrated in FIG. 7. Specifically, the digital camera 80 configured to capture static or dynamic images has a lens barrel 81 located in the center thereof, and the lens barrel 81 includes respective lenses 82, 83, 84, 86, 104, and an iris 85. The shift lens 104 is configured to include the pitch actuator 101, and the yaw actuator 102 illustrated in FIG. 5 incorporated therein. The main body of the digital camera 80 further includes the imager 87, and an image is formed on a surface thereof via the aforementioned respective lenses.

Figure 8:
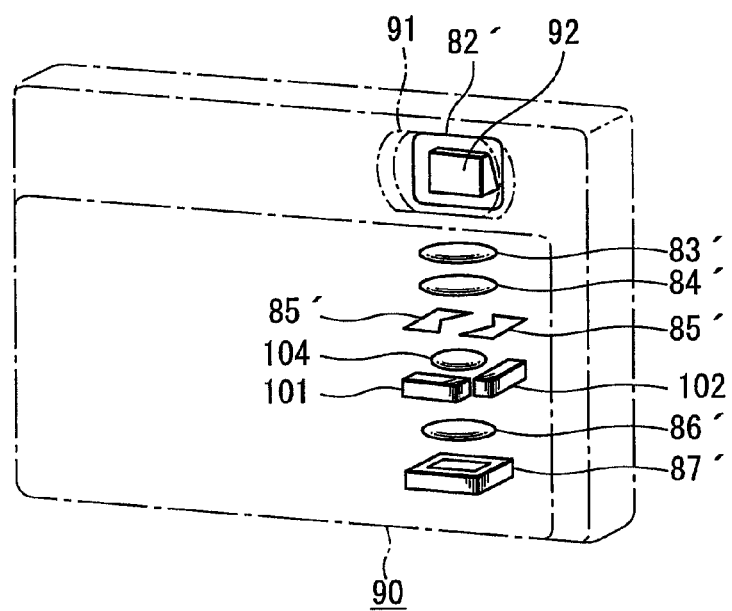
FIG. 8 shows a perspective view illustrating another example of the image pickup apparatus to which an embodiment of the invention is applied.

FIG. 8 is a diagram illustrating an arrangement example of the shift lens unit 100 and other optical components utilized for an image pickup apparatus having another external configuration. Specifically, the digital camera 90 configured to capture static or dynamic images has a viewfinder 91 located close to upper end of the front thereof, over which a fixed lens 82' (or protection glass) is covered. A prism 92 that refracts the optical axis Z downwardly by 90 degrees is placed at the rear of the fixed lens 82'. A fixed lens 83', a zoom lens 84', an iris 85', the shift lens 104, a focus lens 86', and an imager 87' are located in this order along the optical axis refracted by the prism. In this case, shown in FIG. 8, the main body of the digital camera 90 has a comparatively thin configuration, and the optical components such as the lenses 82' to 86' incorporated therein each have a reduced size, accordingly. Further, the shift lens unit 100, not shown in FIG. 8, has a small configuration.

Next, a control configuration for compensating image-blur in an image pickup apparatus according to an embodiment of the invention will be described with reference to FIG. 3. A processing configuration illustrated in FIG. 3 indicates detailed descriptions of the configurations of the lens control unit 120 and peripheral components thereof in FIG. 4, for example. The image pickup apparatus includes a pitch angular velocity sensor 111 detecting an angular velocity applied from outside to the image pickup apparatus in a pitch angle direction, and a yaw angular velocity sensor 114 detecting an angular velocity applied from outside to the image pickup apparatus in a yaw angle direction. The two sensors 111, 114 detect the pitch and yaw angle directions that are equal angle directions compensated by the pitch actuator 101 and the yaw actuator 102 in the shift lens unit 100. However, in if the optical axis is refracted by the prism or the like as illustrated in FIG. 8, the two sensors 111, 114 detect the pitch and yaw angle directions along the optical axis obtained before the refraction of the optical axis.

The output signal detected by the pitch angle sensor 111 is amplified by the amplifier 112, digitized by the analog-to-digital converter 113, and then supplied to the image blur compensation calculator 117. The output signal detected by the yaw angle sensor 114 is amplified by the amplifier 115, digitized by the analog-to-digital converter 116, and then supplied to the image blur compensation calculator 117. The image-blur compensation calculator 117 calculates target positions in compensating image-blur based on the angular velocities of the pitch and yaw angle directions. The image-blur compensation calculator 117 outputs instruction values of the pitch and yaw angle directions indicating the respective target positions calculated.

The pitch angle instruction value calculated by the image-blur compensation calculator 117 is supplied to a PID control operation unit 123 via an adder 121 and a subtracter 122. The PID control operation unit 123 includes a proportional control, an integral control, and a differential control that function in combination. The PID control operation unit 123 calculates the driving amount, based on which the lens is driven to reach the lens position indicated by the instruction value supplied. The driving amount calculated by the PID control operation unit 123 is supplied to a digital-to-analog converter 124 to generate a converted analog signal, and to supply the converted signal to the pitch actuator 101, thereby driving the shift lens 104 in the pitch angle direction. The pitch angle of the shift lens 104 driven in this manner is detected by the pitch position sensor 107. The signal indicating the pitch angle of the shift lens 104 detected by the position sensor 107 is supplied to an analog-to-digital converter 127 via an amplifier 126 to convert the signal into digital data. The digital data converted is supplied to the subtracter 122. The subtracter 122 subtracts the value output by the analog-to-digital converter 127 from the pitch angle instruction value.

Subsequently, a compensation value calculator 125 is provided with the pitch angle driving amount output by the PID control operation unit 123. The compensation value calculator 125 multiplies the supplied driving amount by a compensation coefficient to compute a compensation value. The compensation value obtained by the compensation value calculator 125 is obtained based on the following principles. Specifically, the compensation value is utilized for compensating an amount of influence on a detecting position by the pitch position sensor 101 formed of a hall position sensor due to a magnetic field generated based on a signal applied to the coils 101a (see FIG. 4). The driving amount is multiplied by a compensation coefficient to obtain the compensation value. Alternatively, the compensation value may be obtained by referring to a conversion table prepared for converting driving amounts into compensation value.

The yaw angle instruction value calculated by the image-blur compensation calculator 117 is supplied to a PID control calculator 133 via the adder 131 and the subtracter 132. The PID control calculator 133 calculates the driving amount, based on which the lens is driven to reach the lens position indicated by the instruction value supplied. The driving amount value calculated by the PID control calculator 133 is supplied to a digital-to-analog converter 134 to generate a converted analog signal, and to supply the converted signal to the yaw actuator 102, thereby driving the shift lens 104 in the yaw angle direction.

The yaw angle of the shift lens 104 driven in this manner is detected by the yaw position sensor 108. The signal indicating the yaw angle of the shift lens 104 detected by the yaw position sensor 108 is supplied to an analog-to-digital converter 137 via an amplifier 136 to convert the signal into digital data. The digital data converted is supplied to the subtracter 132. The subtracter 132 subtracts the data output by the analog-to-digital converter 137 from the yaw angle instruction value.

Subsequently, a compensation value calculator 135 is provided with the yaw angle driving amount output by the PID control operation unit 133. The compensation value calculator 135 multiplies the supplied driving amount by a compensation coefficient to obtain a compensation value. The compensation value obtained by the compensation value calculator 135 is obtained based on the following principles. Specifically, the compensation value is utilized for compensating an amount of influence on a position detected by the yaw actuator 102 formed of a hall position sensor due to a magnetic field generated based on a signal applied to the coils 102a (see FIG. 6A). The driving amount is multiplied by a compensation coefficient to obtain the compensation value. Alternatively, the compensation value may be obtained by referring to a conversion table prepared for converting driving amounts into compensation value.

Figure 1:
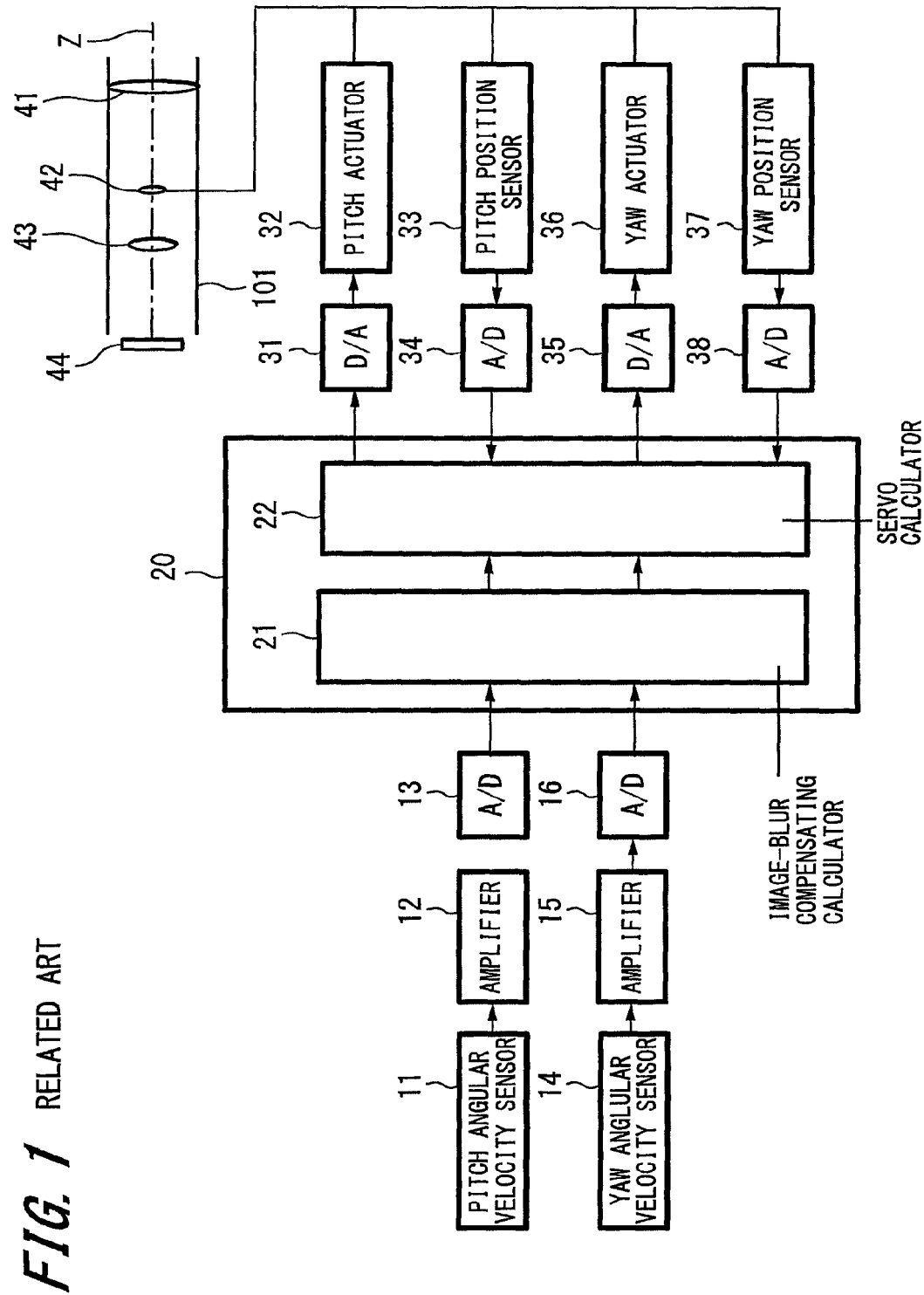
FIG. 1 shows a block diagram illustrating a configuration example of an image pickup apparatus according to a related art.
Figure 2:
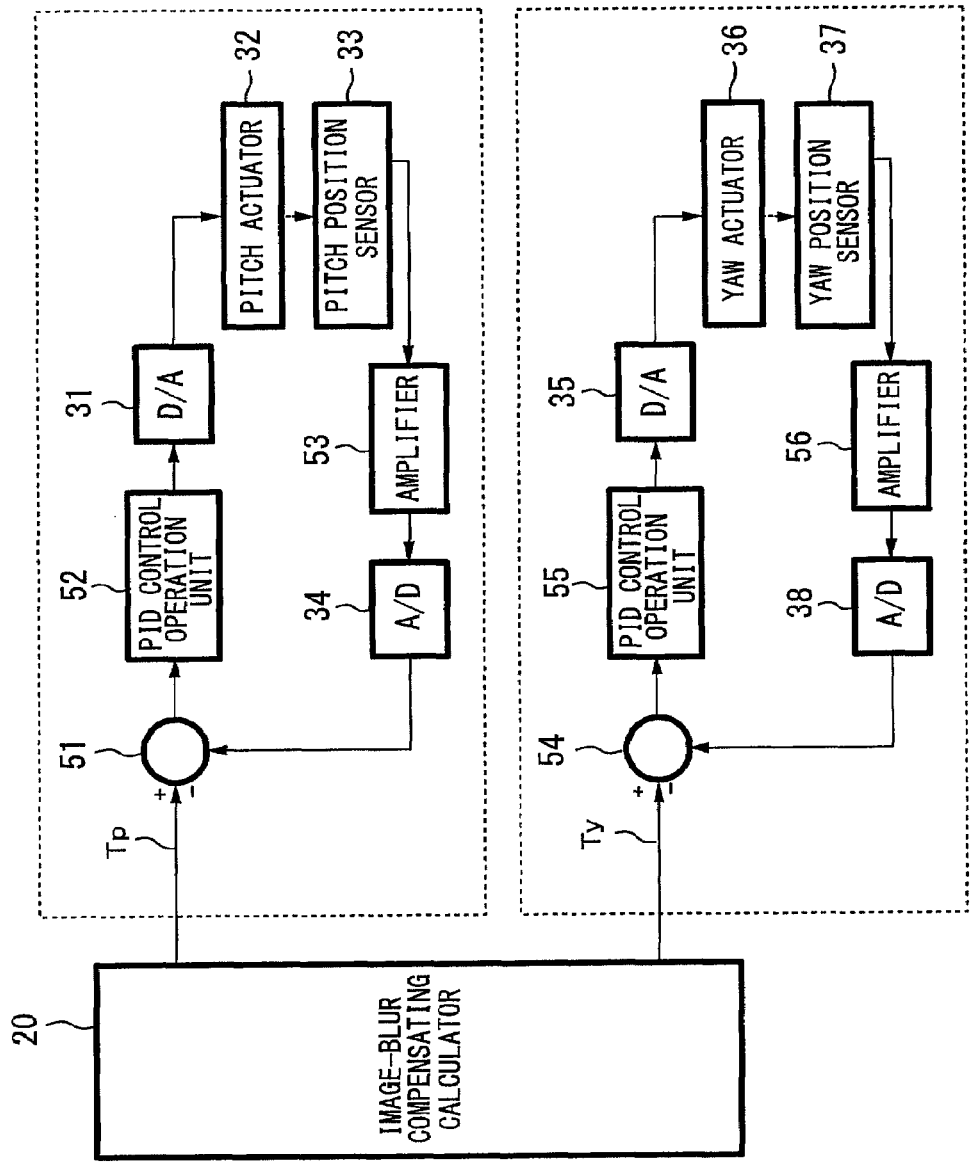
FIG. 2 shows a block diagram illustrating a configuration example of a periphery of a shift lens driver in the image pickup apparatus according to the related art.

Since the compensating device in the image pickup apparatus is configured to carry out servo calculation calculating driving amounts of the pitch and yaw positions in FIG. 1, excellent image-blur compensation can be performed. Specifically, based on the pitch and yaw angles, the actuator 101, 102 calculate amounts of influence due to magnetic field with the sensors 107, 108 formed of the hall elements for detecting shifted positions of the lens, and compensate the amount of influence to generate driving signals. Thus, the interference caused by the proximity of the distance between the actuator and position sensor can be eliminated. The above configuration is effective when the image pickup apparatus shown in FIG. 6 needs to include the shift lens 100 having a significantly small size, and also when it is difficult to arrange the sensors 107, 108 near the actuators 101, 102 therein without having the amount of influence due to the magnetic force generated by the actuators 101, 102. The shift lens unit 100 for compensating an image-blur can be reduced in size, and hence the image pickup system exhibiting excellent image-blur compensation can also be reduced in size.

The pitch angle instruction value calculated by the image-blur compensation calculator 117 is supplied to an adder 121. The adder 121 adds compensation value output by a compensation value calculator 125 described later, and supplies the resulting value to a subtracter 122. The subtracter 122 subtracts the value of the current pitch angle detected by the pitch position sensor 107, and supplies the resulting difference of the instruction value obtained by the subtraction to a PID control operation unit 123 to calculate a driving amount of the pitch angle. The PID control operation unit 123 calculates the driving amount to drive the lens so that a value of the lens position is equal to the supplied instruction value. The driving amount calculated by the PID control operation unit 123 is supplied to a digital-to-analog converter 124 to generate a converted analog signal, and supply the signal to the pitch actuator 101 to drive the shift lens 104 in the pitch angle direction. The pitch position sensor 107 detects the pitch angle of the shift lens 104, supplies the detected signal to an analog-to-digital converter 127 via an amplifier 126 to convert the signal into digital data, and then supplies the converted data to the subtracter 122.

The driving amount of the pitch angle output by the PID control operation unit 123 is supplied to the compensation value calculator 125 to multiply the driving amount by a compensation coefficient, thereby calculating a compensation value. The compensation value is utilized for compensating an amount of influence on a position detected by the pitch position sensor 107 forming a hall position sensor, due to a magnetic field generated based on a signal applied to the coils 101a (see FIG. 6) forming the pitch actuator 101. The compensation value is calculated by multiplying the driving amount by a compensation coefficient. Alternatively, the compensation value may be obtained by referring to a conversion table prepared for converting a driving amount into a compensation value.

Further, the instruction value of the pitch angle calculated by the image-blur compensation calculator 117 is supplied to an adder 131 to add compensation value output by a compensation value calculator 135 described later, and supply the added signal to a subtracter 132. The subtracter 132 subtracts the current yaw angle detected by the yaw position sensor 108, and supplies the resulting difference of the instruction obtained by the subtraction to a PID control operation unit 133 to calculate a driving amount of the yaw angle. The PID control operation unit 133 calculates the driving amount to drive the lens so that a value of the lens position is equal to the supplied instruction value. The driving amount calculated is supplied to a digital-to-analog converter 134 to generate a converted analog signal, and supply the signal to the yaw actuator 102 to drive the shift lens 104 in the yaw angle direction. The yaw position sensor 108 detects the yaw angle of the shift lens 104, supplies the detected signal an analog-to-digital converter 137 via an amplifier 136 to convert the signal into digital data, and then supplies the converted data to the subtracter 132.

The driving amount of the yaw angle output by the PID control operation unit 133 is supplied to the compensation value calculator 135 to multiply the driving amount by a compensation coefficient, thereby calculating a compensation value. The compensation value is utilized for compensating an amount of influence on a position detected by the yaw position sensor 108 forming a hall position sensor due to a magnetic field generated based on a signal applied to the coils 102a (see FIG. 6) forming the yaw actuator 102. The compensation value is calculated by multiplying the driving amount by a compensation coefficient. Alternatively, the compensation value may be obtained by referring to a conversion table prepared for converting a driving amount to a compensation value.

Figure 3:
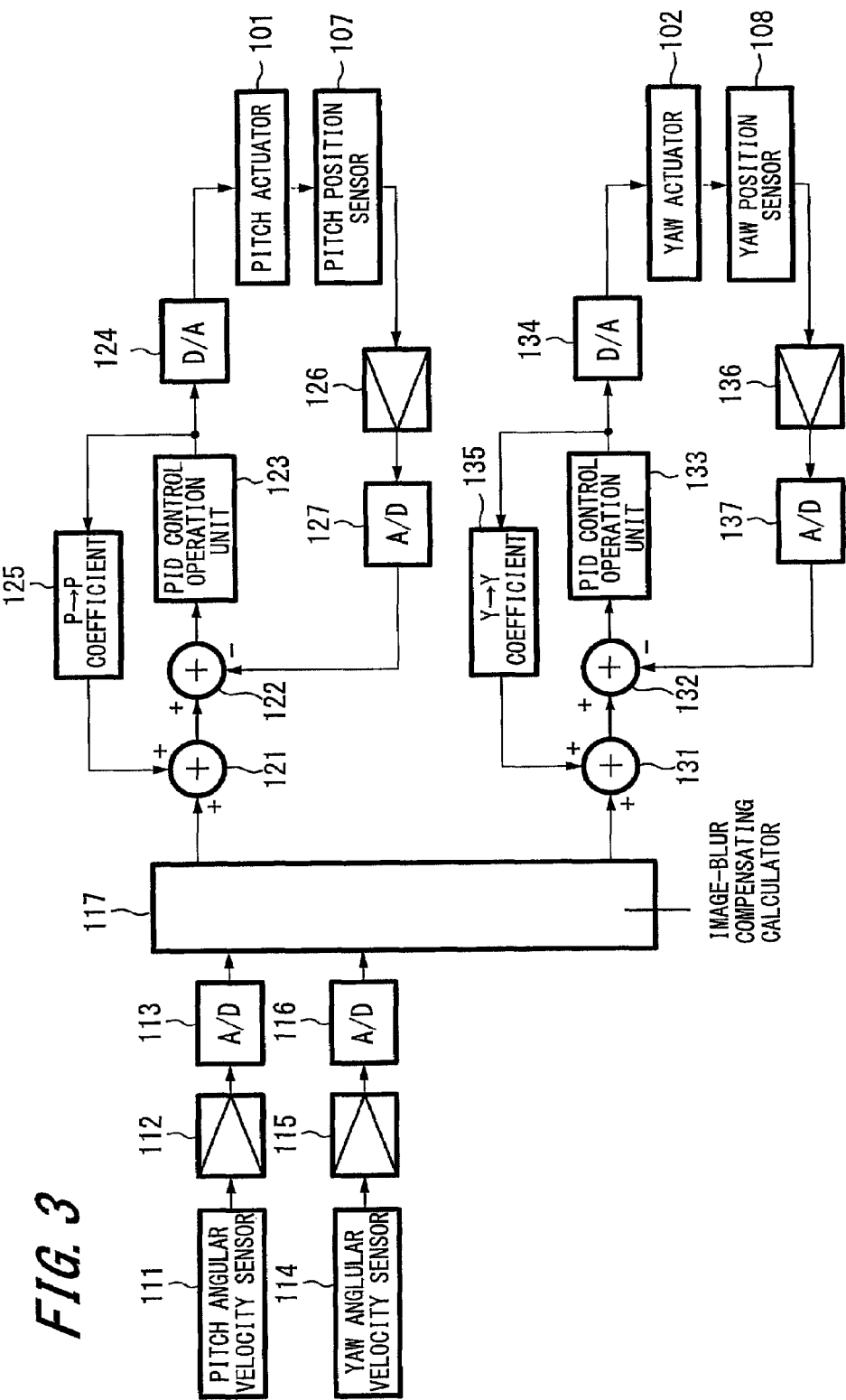
FIG. 3 shows a block diagram illustrating a configuration example of an image pickup apparatus according to a first embodiment of the invention.

Since the compensating device of the image pickup apparatus is configured to carry out servo calculation calculating the driving amounts of the pitch and yaw positions in FIG. 3, excellent image-blur compensation can be performed. Specifically, using the driving amount of pitch and yaw angles, the magnetic actuators 101, 102 calculate the amount of influence due to the magnetic field that affects the sensors 107, 108 formed of the hall elements for detecting the shift positions, and compensate the influence to generate the driving signals for pitch and yaw angles. Thus, the influence due to the proximity between the actuators and the position sensors can be eliminated. The above configuration of the image pickup apparatus shown in FIG. 8 is effective when the image pickup apparatus needs to include the shift lens unit 100 having a significantly small size, and also when it is difficult to arrange the sensors 107, 108 near the actuators 101, 102 therein without having the influence due to the magnetic force generated by the actuators 101, 102. The shift lens unit 100 for compensating an image-blur can be reduced in size, and hence the image pickup system exhibiting excellent image-blur compensation can also be reduced in size.

Next, a second embodiment of the invention will be described below with reference to FIG. 9. The second embodiment is also configured to incorporate an image-blur (unintentional hand-movements) compensating device for compensating an image-blur in capturing images. The second embodiment includes the same components of the first embodiment corresponding to those in the second embodiment except for a control configuration of the second embodiment illustrated in FIG. 9 in place of the control configuration of the first embodiment illustrated in FIG. 3. The same reference numerals are provided with the components of the second embodiment corresponding to those of the first embodiment of the invention illustrated in FIG. 3 or the like.

The image-blur compensation calculator 117 calculates compensation instruction values for target positions in compensating image-blur based on an output signal from the sensor 111 detecting the angular velocity of the pitch angle direction, and an output signal from the sensor 114 detecting the angular velocity of the yaw angle direction.

The instruction value of the pitch angle calculated by the image-blur compensation calculator 117 is supplied to an adder 121. The adder 121 adds the instruction value and a compensation value output by a compensation value calculator 125 described later, and supplies the resulting value to a subtracter 122. The subtracter 122 subtracts the current pitch angle detected by the pitch position sensor 107 therefrom, and supplies the resulting difference of the instruction obtained by subtraction to a PID control operation unit 123 to calculate a driving amount of the pitch angle. The PID control operation unit 123 calculates the driving amount to drive the lens in the pitch angle direction, with which the value indicating the lens position is equal to the supplied instruction value. The driving amount calculated by the PID control operation unit 123 is supplied to a digital-to-analog converter 124 to generate a converted analog signal, and supply the signal to the pitch actuator 101, thereby driving the shift lens 104 in the pitch angle direction. The position sensor 107 detects the pitch angle of the shift lens 104, supplies the detected signal to an analog-to-digital converter 127 via an amplifier 126 to convert the signal into digital data, and then supplies the converted digital data to the subtracter 122.

The driving amount of the pitch angle output by the PID control operation unit 123 is supplied to the compensation value calculator 125. Further, the position of current pitch angle output by the analog-to-digital converter 127 is also supplied to the compensation value calculator 125. The compensation value calculator 125 multiplies each of the driving amount of the actuator supplied thereto and the current pitch angle value by a compensation coefficient to compute a compensation value. The compensation value is utilized for compensating an amount of influence on a position detected by the pitch position sensor 107 forming a hall position sensor due to a magnetic field generated based on a signal applied to the coils 101a (see FIG. 8) forming the pitch actuator 101. The compensation value is further compensated based on the current pitch angle.

The instruction value of yaw angle calculated by the image-blur compensation calculator 117 is supplied to an adder 131. The adder 132 adds the instruction value to a compensation value output by a compensation value calculator 135 described later, and supplies the resulting value to a subtracter 132. The subtracter 132 subtracts the current yaw angle detected by the yaw position sensor 108, and supplies the resulting difference of the instruction value obtained by subtraction to a PID control operation unit 133 to calculate a driving amount of the yaw angle. The PID control calculator 133 calculates the driving amount to drive the lens, so that the value of the lens position is equal to the supplied instruction value. The driving amount calculated by the PID control operation unit 133 is supplied to a digital-to-analog converter 134 to generate a converted analog signal, and supply the signal to the yaw actuator 102, thereby driving the shift lens 104 in the yaw angle direction. The yaw position sensor 108 detects the yaw angle of the shift lens 104, supplies the detected signal to an analog-to-digital converter 137 via an amplifier 136 to convert the signal into digital data, and then supplies the converted data to the subtracter 132.

The driving amount of yaw angle output by the PID control operation unit 133 is supplied to the compensation value calculator 135. Further, the value indicating position of current yaw angle output by the analog-to-digital converter 137 is also supplied to the compensation value calculator 135. The compensation value calculator 135 multiplies each of the driving amount of the actuator supplied thereto and the current yaw angle value by a compensation coefficient to compute a compensation value. The compensation value is utilized for compensating an amount of influence on a position detected by the yaw position sensor 108 forming a hall position sensor due to a magnetic field generated based on a signal applied to the coils 102a (see FIG. 6) forming the yaw actuator 102. The resulting compensation value is further compensated based on the current yaw angle.

Figure 9:
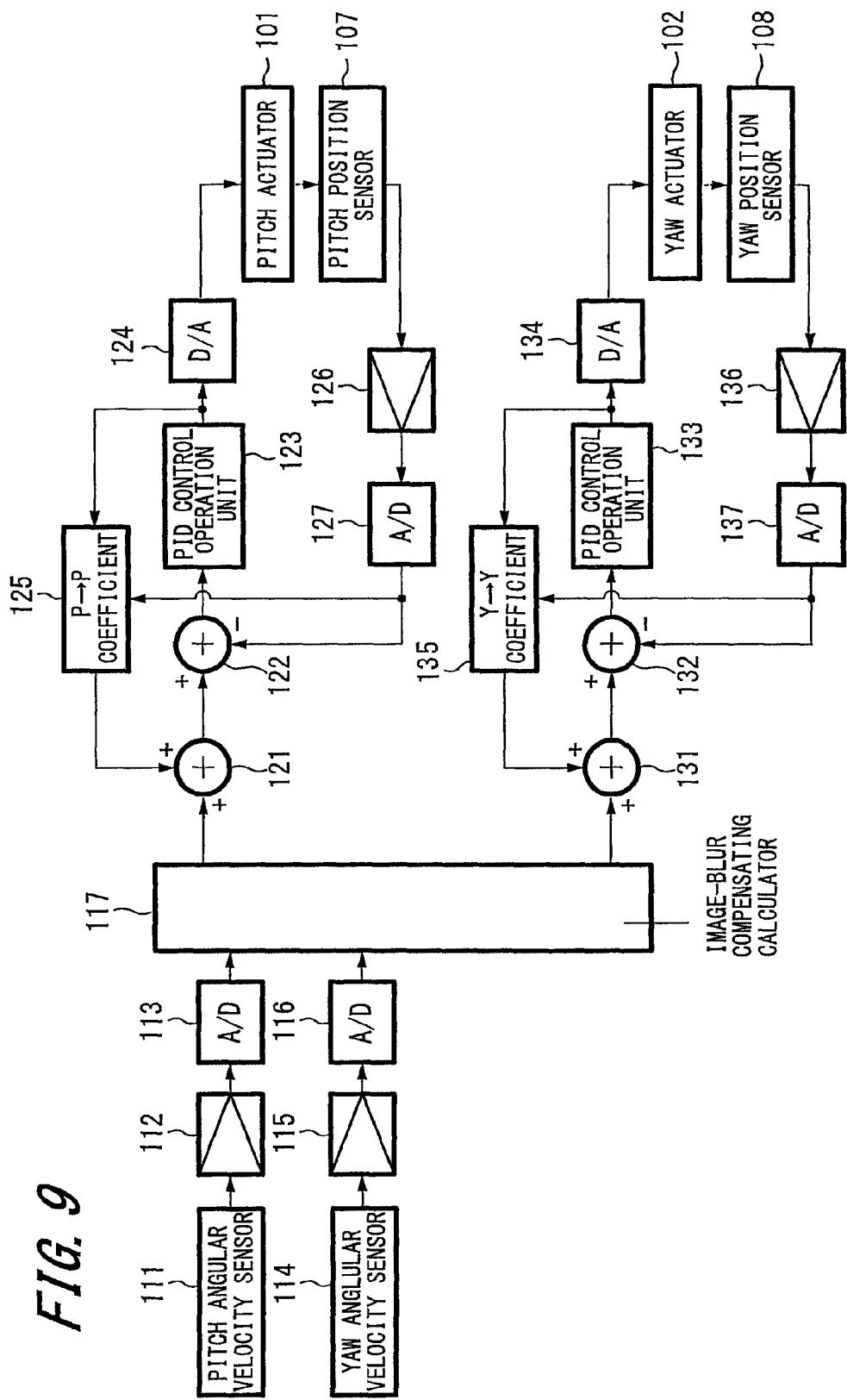
FIG. 9 shows a block diagram illustrating a configuration example of an image pickup apparatus according to a second embodiment of the invention.

As shown in FIG. 9, the compensation values of the pitch and yaw angles are computed based on the driving amounts of pitch and yaw actuators and the positions thereof. Thus, in this embodiment, the pitch and yaw angles can accurately be controlled by the compensation based on the resulting compensation values, and hence the image-blur is more accurately compensated, as compared with the configuration example described in the first embodiment.

Figure 10:
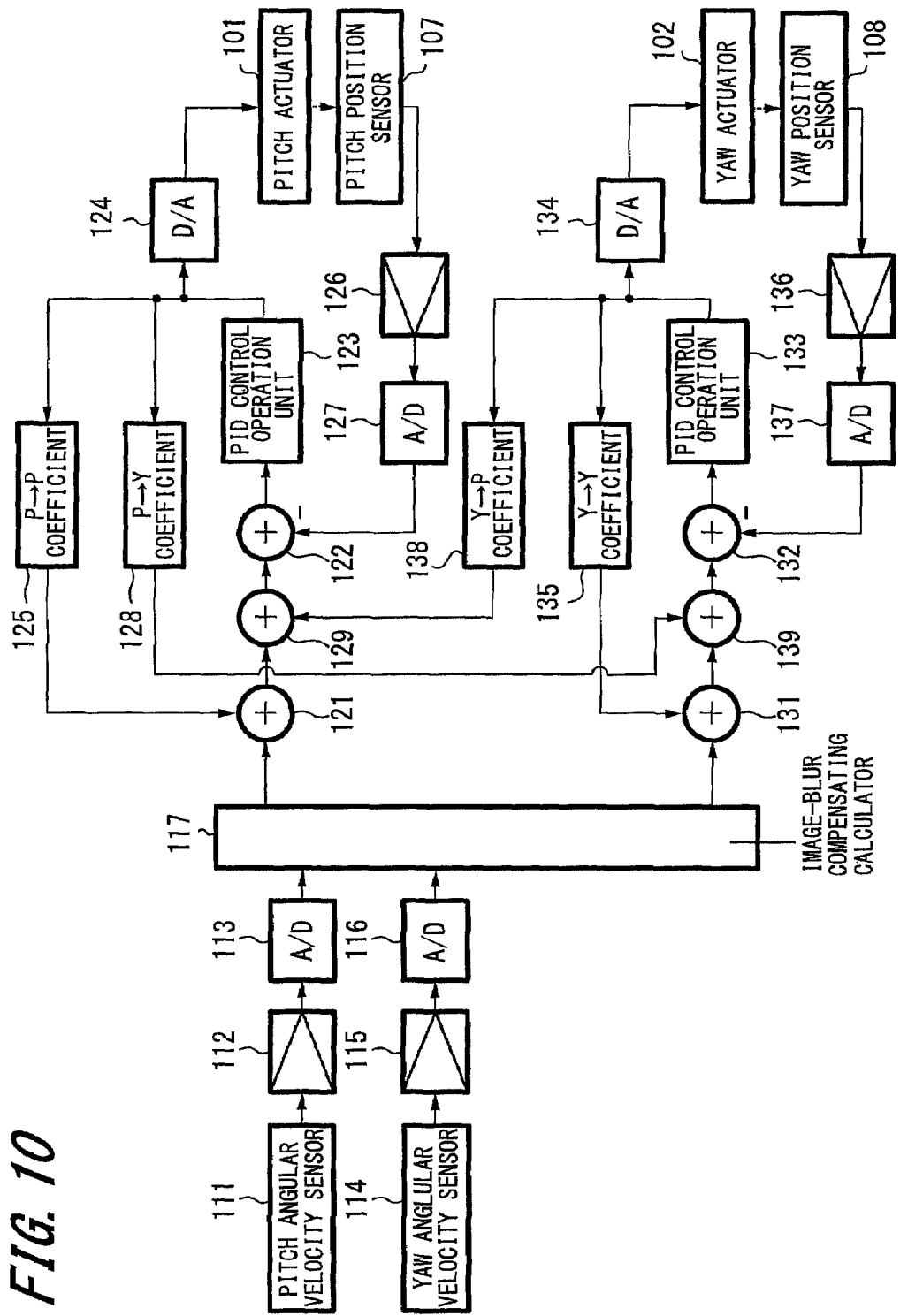
FIG. 10 shows a block diagram illustrating a configuration example of an image pickup apparatus according to a third embodiment of the invention.

Next, a third embodiment of the invention will be described below with reference to FIG. 10. The third embodiment is also configured to incorporate an image-blur (hand-movements) compensating device for compensating an image-blur in capturing images. The third embodiment includes a control configuration illustrated in FIG. 10 in place of the control configuration of the first embodiment illustrated in FIG. 3, and other components of the third embodiment in FIG. 10 are the same as those of the configuration illustrated in the first embodiment. The same reference numerals are provided with the components of the third embodiment in FIG. 10 corresponding to those of the first embodiment of the invention illustrated in FIG. 3 or the like.

The image-blur compensation calculator 117 calculates compensation instruction values for target positions in compensating image-blur based on an output signal from the sensor 111 detecting the angular velocity of the pitch angle direction, and an output signal from the sensor 114 detecting the angular velocity of the yaw angle direction.

The pitch angle instruction value calculated by the image-blur compensation calculator 117 is supplied to an adder 121, which adds a compensation value output by the compensation value calculator 125 thereto. The resulting value is supplied to the adder 129, which adds a compensation value output by the compensation value calculator 138 thereto. The adder 129 supplies the obtained value to the subtracter 122. The subtracter 122 subtracts the value of the current pitch angle detected by the pitch position sensor 107 therefrom, and supplies the resulting difference of the instruction value obtained by subtraction to the PID control calculator 123 to calculate a driving amount of the pitch angle. The PID control calculator 123 calculates the driving amount to drive the lens in the pitch angle direction, with which value indicating the lens position is equal to the supplied instruction value.

The driving amount calculated by the PID control calculator 123 is supplied to a digital-to-analog converter 124 to generate a converted analog signal, and supply the signal to the pitch actuator 101, thereby driving the shift lens 104 in the pitch angle direction. The position sensor 107 detects the pitch angle of the shift lens 104, supplies the detected signal to an analog-to-digital converter 127 via an amplifier 126 to convert the signal into digital data, and then supplies the converted digital data to the subtracter 122.

The driving amount of the pitch angle output by the PID control calculator 123 is supplied to each of the compensation value calculators 125, 128 to multiply the driving amounts by compensation coefficients, thereby obtaining compensation values. The compensation value is utilized for compensating an amount of influence on a position detected by the pitch position sensor 107 forming a hall position sensor, due to a magnetic field generated based on a signal applied to the coils 101a (see FIG. 6) forming the pitch actuator 101. The compensation value is calculated by multiplying the driving amount by a compensation coefficient.

The instruction value of yaw angle calculated by the image-blur compensation calculator 117 is supplied to the adder 131 to add thereto a compensation value output by a compensation value calculator 135 described later. The adder 131 then supplies the resulting value to an adder 139 to add thereto a compensation value output by the compensation value calculator 128, and supplied the added value to the subtracter 132. The subtracter 132 subtracts the current yaw angle detected by the yaw position sensor 108, and supplies the resulting difference of the instruction value obtained by subtraction to a PID control calculator 133 to calculate a driving amount of the yaw angle. The PID control calculator 133 calculates the driving amount to drive the lens, so that the value of the lens position is equal to the supplied instruction value. The driving amount calculated is supplied to the digital-to-analog converter 134 to generate a converted analog signal, and supply the signal to the yaw actuator 102 to drive the shift lens 104 in the yaw angle direction. The yaw position sensor 108 detects the yaw angle of the shift lens 104, supplies the detected signal to the analog-to-digital converters 137 via an amplifier 136 to convert the signal into digital data, and then supplies the converted data to the subtracter 132.

The driving amount of the yaw angle output by the PID control calculator 133 is supplied to each of the compensation value calculators 135, 138 to multiply the driving amounts by compensation coefficients, thereby calculating compensation values. The compensation value computed by the compensation value calculator 135 is utilized for compensating an amount of influence on a position detected by the yaw position sensor 108 forming a hall position sensor due to a magnetic field generated based on a signal applied to the coils 102a (see FIG. 6) forming the yaw actuator 102. The compensation value is calculated by multiplying the driving amount by a compensation coefficient. The compensation value computed by the compensation value calculator 138 is utilized for compensating an amount of influence on a position detected by the pitch position sensor 107 forming a hall position sensor due to a magnetic field generated based on a signal applied to the coils 102a forming the yaw actuator 102. The compensation value is calculated by multiplying the driving amount by a compensation coefficient.

As shown in FIG. 10, with the compensation values of the pitch and yaw angles being computed, the pitch position is compensated based on the driving amount of pitch actuator, and the yaw position is compensated based on the driving amount of yaw actuator. Simultaneously, the yaw position is compensated based on the driving amount of pitch actuator, and the pitch position is compensated based on the driving amount of yaw actuator. Thus, in this embodiment, the pitch and yaw angles can accurately be controlled, and hence the image-blur is more accurately compensated, as compared with the configuration example described in the first embodiment in FIG. 3.

Figure 11:
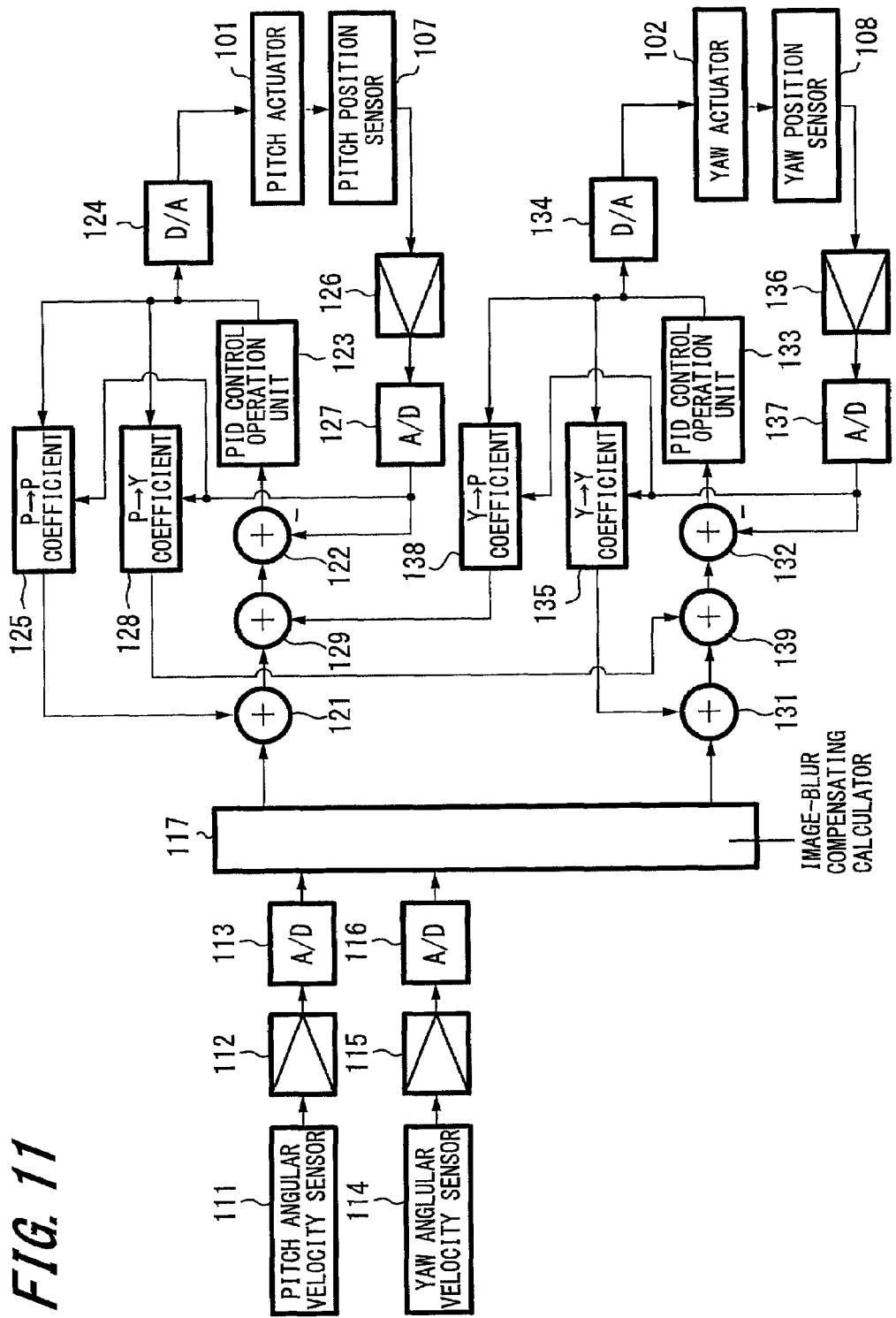
FIG. 11 shows a block diagram illustrating a configuration example of an image pickup apparatus according to a forth embodiment of the invention.

Next, a fourth embodiment of the invention will be described below with reference to FIG. 11. The fourth embodiment is also configured to incorporate an image-blur (hand-movements) compensating device for compensating an image-blur in capturing images. The fourth embodiment includes a control configuration illustrated in FIG. 10 in place of the control configuration of the first embodiment illustrated in FIG. 3, and other components of the fourth embodiment in FIG. 11 are the same as those of the configuration illustrated in the first embodiment. The same reference numerals are provided with the components of the fourth embodiment corresponding to those of the first and third embodiments of the invention illustrated in FIG. 3 and FIG. 10.

The image-blur compensation calculator 117 calculates compensation instruction values for target positions in compensating image-blur based on an output signal from the sensor 111 detecting the angular velocity of the pitch angle direction, and an output signal from the sensor 114 detecting the angular velocity of the yaw angle direction.

The instruction value of pitch angle calculated by the image-blur compensation calculator 117 is supplied to the adder 121 to add thereto a compensation value output by a compensation value calculator 125. The resulting value is supplied to the adder 129 to add thereto a compensation value output by the compensation value calculator 138. The obtained value is output by the adder 129 and then supplied to a subtracter 122. The subtracter 122 subtracts the current pitch angle detected by the pitch position sensor 107 therefrom, and supplies the resulting difference of the instruction value obtained by subtraction to the PID control calculator 123 to calculate a driving amount of the pitch angle. The PID control calculator 123 calculates the driving amount to drive the lens in the pitch angle direction, with which value of the lens position is equal to the supplied instruction value.

The driving amount calculated by the PID control calculator 123 is supplied to a digital-to-analog converter 124 to generate a converted analog signal, and supply the signal to the pitch actuator 101, thereby driving the shift lens 104 in the pitch angle direction. The position sensor 107 detects the pitch angle of the shift lens 104, supplies the detected signal to an analog-to-digital converter 127 via an amplifier 126 to convert the signal into digital data, and then supplies the converted digital data to the subtracter 122.

The driving amount of the pitch angle output by the PID control calculator 123 is supplied to each of the compensation value calculators 125, 128 to multiply the driving amounts by compensation coefficients, thereby obtaining compensation values. A pitch position value output by an analog-to-digital converter 127 is supplied to each of the compensation value calculators 125, 128, thereby obtaining compensation value to be used in driving the lens to reach a current pitch position. The compensation value computed by the compensation value calculator 125 is utilized for compensating influence on a position detected by the pitch position sensor 107 forming a hall position sensor due to a magnetic field generated based on a signal applied to the coils 101a (see FIG. 6) forming the pitch actuator 101. Simultaneously, the obtained compensation value is further compensated so as to drive the lens to reach the current pitch position. The compensation value computed by the compensation value calculator 128 is utilized for compensating influence on a position detected by the pitch position sensor 108 forming a hall position sensor due to a magnetic field generated based on a signal applied to the coils 101a forming the pitch actuator 101. Simultaneously, the obtained compensation value is further compensated so as to drive the lens to reach the current pitch position.

The instruction value of yaw angle calculated by the image-blur compensation calculator 117 is supplied to the adder 131 to add thereto a compensation value output by a compensation value calculator 135 described later. The adder 131 then supplies the resulting value to the adder 139 to add thereto a compensation value output by the compensation value calculator 128, and supplied the added value to the subtracter 132. The subtracter 132 subtracts the current yaw angle detected by the yaw position sensor 108, and supplies the resulting difference of the instruction value obtained by subtraction to a PID control calculator 133 to calculate a driving amount of the yaw angle. The PID control calculator 133 calculates the driving amount to drive the lens, so that the value indicating the lens position is equal to the supplied instruction value. The driving amount calculated is supplied to the digital-to-analog converter 134 to generate a converted analog signal, and supply the signal to the yaw actuator 102 to drive the shift lens 104 in the yaw angle direction. The yaw position sensor 108 detects the yaw angle of the shift lens 104, supplies the detected signal to the analog-to-digital converters 137 via an amplifier 136 to convert the signal into digital data, and then supplies the converted data to the subtracter 132.

The driving amount of the yaw angle output by the PID control calculator 133 is supplied to each of the compensation value calculator 135, 138 to multiply the driving amounts by compensation coefficients, thereby calculating compensation values. The compensation value computed by the compensation value calculator 135 is utilized for compensating an amount of influence on a position detected by the yaw position sensor 108 forming a hall position sensor due to a magnetic field generated based on a signal applied to the coils 102a (see FIG. 6) forming the yaw actuator 101. Simultaneously, the obtained compensation value is further compensated so as to drive the lens to reach the current yaw position. The compensation value computed by the compensation value calculator 138 is utilized for compensating an amount of influence on a position detected by the pitch position sensor 107 forming a hall position sensor due to a magnetic field generated based on a signal applied to the coils 102a forming the yaw actuator 102. Simultaneously, the obtained compensation value is further compensated so as to drive the lens to reach the current yaw position.

As shown in FIG. 10, with the compensation values of the pitch and yaw angles being computed, the pitch position is compensated based on the driving amount of pitch actuator, and the yaw position is compensated based on the driving amount of yaw actuator. Simultaneously, the yaw position is compensated based on the driving amount of pitch actuator, and the pitch position is compensated based on the driving amount of yaw actuator. Further, in this embodiment, since the values of the pitch and yaw angles are compensated based on the values of the pitch and yaw positions, the pitch and yaw angles can accurately be controlled, and hence the image-blur is more accurately compensated, as compared with the configuration example described in the first or third embodiments in FIG. 3 or FIG. 10.

The following equation 1 is used to obtain the compensated instruction value Tcp supplied to the PID control operation unit 123 for the pitch angle in FIG. 11, and the compensated instruction value Tcy supplied to the PID control operation unit 133 for the yaw angle.

$$Tcp = Trp + \{D_p(K_{pp} \cdot P_p + C_{pp})\} + \{D_y(K_{yp} \cdot P_y + C_{yp})\}$$

$$Tcy = Try + \{D_y(K_{yy} \cdot P_y + C_{yy})\} + \{D_p(K_{py} \cdot P_p + C_{py})\} \quad \text{[Equation 1]}$$

Tcp, Tcy: instruction values after compensation (pitch, yaw)
Trp, Try: instruction values having no influence from actuator (pitch, yaw)
$P_p$, $P_y$: lens positions (pitch, yaw)
$D_p$, $D_y$: applied voltage (pitch, yaw)
$K_{ab}$: coefficient indicating an amount of influence induced from magnetic field a generated by actuator on hall sensor b (pitch, yaw)
$C_{ab}$: a constant (a, beach represent one of pitch value and represents yaw value)

Figure 12:
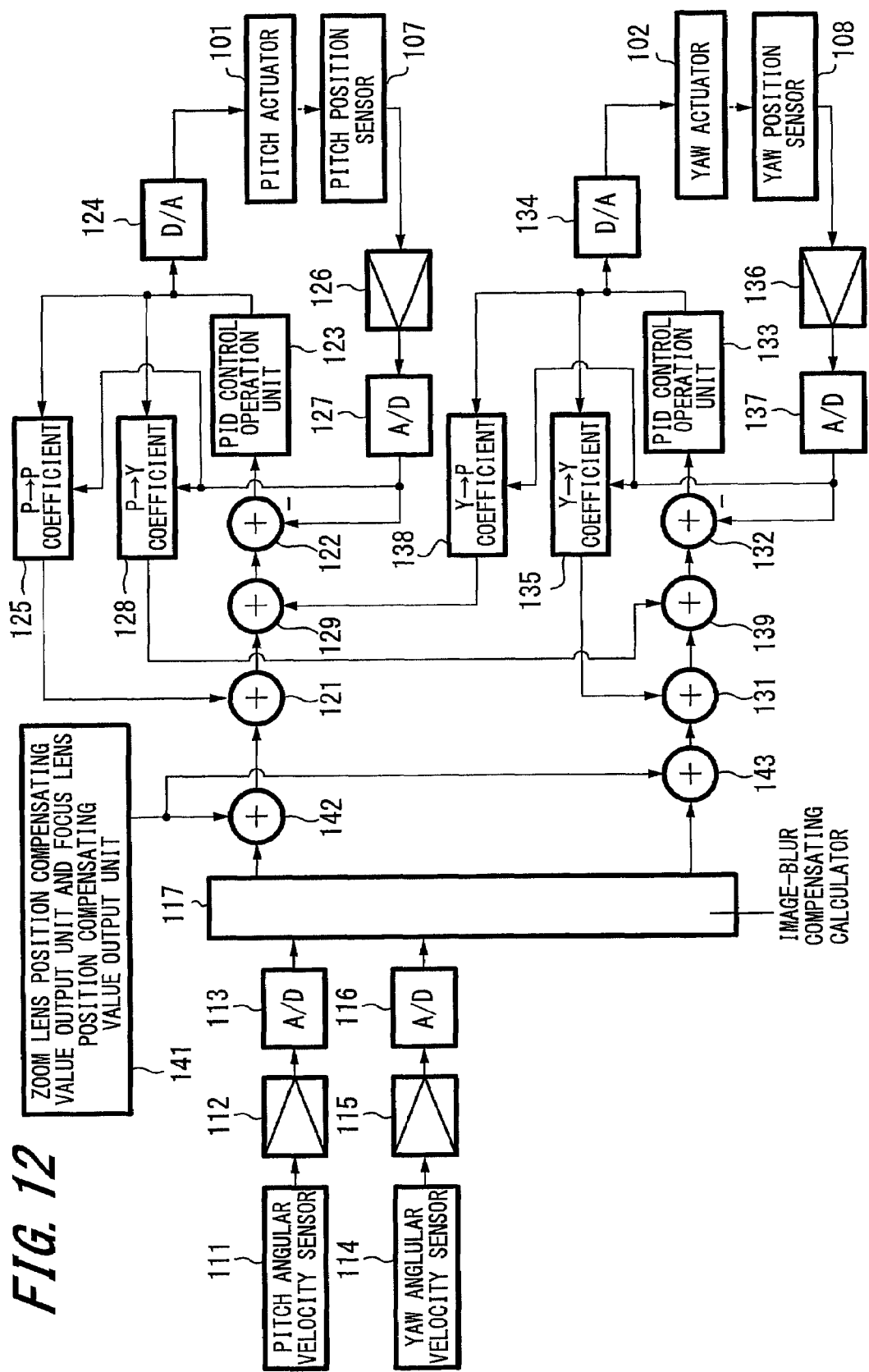
FIG. 12 shows a block diagram illustrating a configuration example of an image pickup apparatus according to a fifth embodiment of the invention.

Next, a fifth embodiment of the invention will be described below with reference to FIG. 12. The fifth embodiment is also configured to incorporate an image-blur (hand-movements) compensating device for compensating an image-blur in capturing images. The fifth embodiment includes a control configuration illustrated in FIG. 12 in place of the control configuration of the fourth embodiment illustrated in FIG. 11, and other components of the fifth embodiment in FIG. 12 are the same as those of the configuration illustrated in the first embodiment. The same reference numerals are provided with the components of the fifth embodiment in FIG. 12 corresponding to those of the first and fourth embodiments of the invention illustrated in FIG. 3 and FIG. 11.

The configuration of the fifth embodiment of the invention shown in FIG. 12 has fundamentally the same configuration of the control configuration illustrated in FIG. 11. In this embodiment, the instruction value of the pitch angle calculated by the image-blur compensation calculator 117 is supplied to an adder 142. The adder 142 adds thereto compensation values output by a zoom lens and focus lens positions output unit 141, and the resulting values output by the adder 142 are supplied to the adder 121. Further, the instruction value of the yaw angle calculated by the image-blur compensation calculator 117 is supplied to an adder 143. The adder 143 adds thereto compensation values output by the zoom lens and focus lens positions output unit 141, and the resulting values output by the adder 143 are supplied to the adder 131.

The zoom lens and focus lens positions output unit 141 computes a compensation value by compensating an amount of influence by actuators for driving the zoom lens on the instruction value of the pitch angle based on a position of the zoom lens. Further, the focus lens and focus lens positions output unit 141 computes a compensation value by compensating an amount of influence by actuators driving the focus lens on the instruction value of the pitch angle based on a position of the focus lens. The computed compensation values are both added together and then output by the focus lens and focus lens positions output unit 141.

Thus, since the values of the zoom and focus lens positions can both be compensated, and the value of the shift lens position can be compensated, thereby achieving excellent image-blur compensation. Note that compensation for the above configuration may be performed based on one of the values of the zoom lens position and focus lens position.

Figure 13:
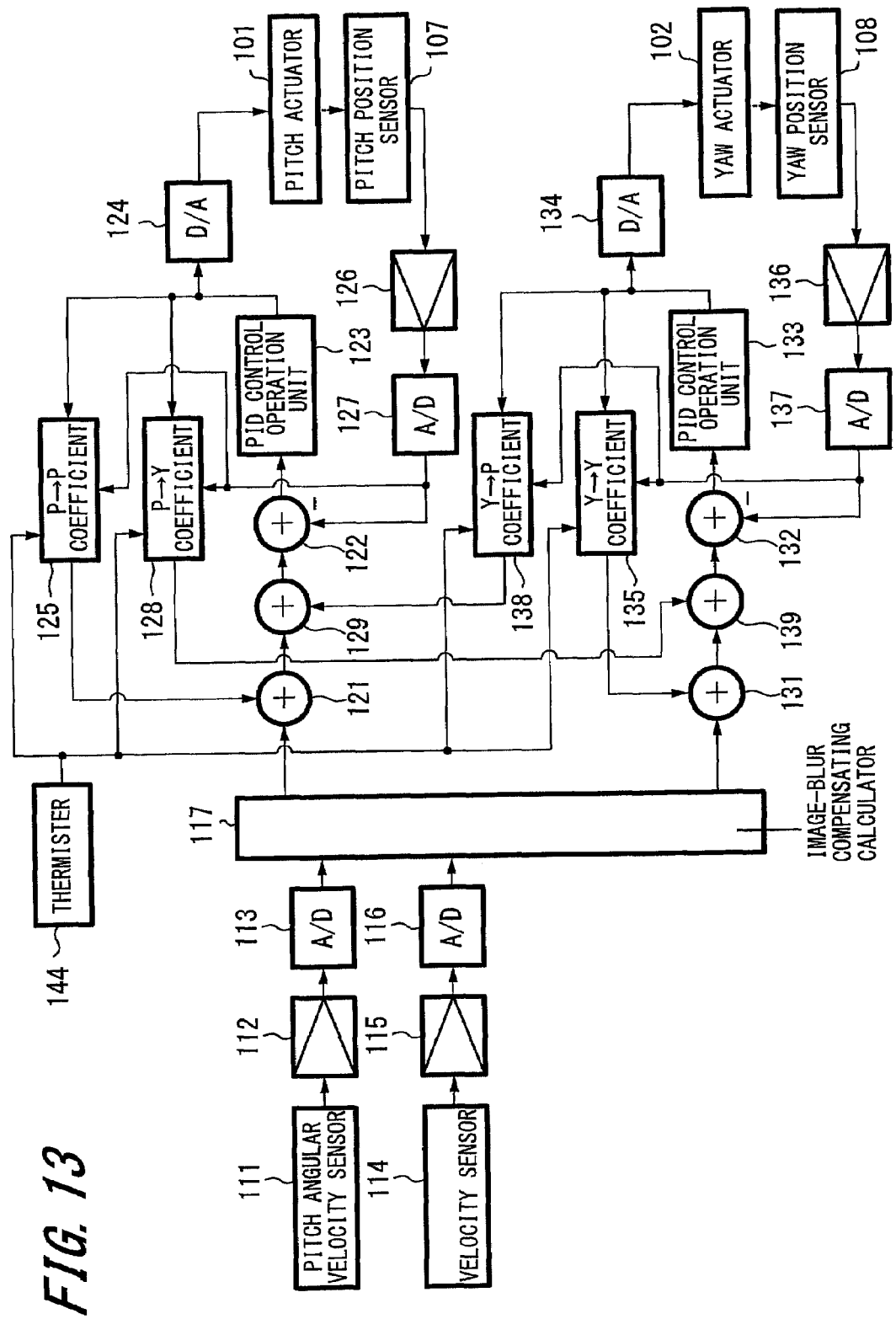
FIG. 13 shows a block diagram illustrating a configuration example of an image pickup apparatus according to a sixth embodiment of the invention.

Next, a six embodiment of the invention will be described below with reference to FIG. 13. The sixth embodiment is also configured to incorporate an image-blur (hand-movements) compensating device for compensating an image-blur in capturing images. The sixth embodiment includes a control configuration illustrated in FIG. 12 in place of the control configuration of the fourth embodiment illustrated in FIG. 11, and other components of the sixth embodiment in FIG. 13 are the same as those of the configuration illustrated in the first embodiment. The same reference numerals are provided with the components of the sixth embodiment in FIG. 13 corresponding to those of the first and fourth embodiments of the invention illustrated in FIG. 3 and FIG. 11.

The configuration of the sixth embodiment of the invention shown in FIG. 13 has fundamentally the same configuration of the control configuration illustrated in FIG. 11. The sixth embodiment includes a thermistor 144 as temperature detecting element that detects temperature near the shift lens unit in the image pickup apparatus. Subsequently, temperature data detected by the thermistor 144 are supplied to respective compensation value calculators 125, 128, 135, and 138. The compensation values for the compensation calculator 125, 128, 135, and 138 are computed based on the supplied temperature, performing temperature compensation processing to compensate the compensation values. Subsequently, temperature data detected by the thermistor 121 are supplied to respective compensation value calculators 121, 129, 131, and 139.

Since the position sensors 107, 108 exhibits temperature properties in the detected values, the temperature properties of the sensors can be compensated based on the obtained temperature. Moreover, although the temperature of the environment is varied, in which images are captured by the image pickup apparatus, an excellent compensation can be performed.

Note that the embodiments described so far are merely preferred examples and not limited to those configurations illustrated in the drawings. Further, an example having a hall element is described as a sensor for detecting positions; however, the hall element may also be employed for other sensors having influence from the actuators.

Moreover, processing configurations described in the embodiments may be combined. For example, compensation based on the zoom lens position or focus lens position illustrated FIG. 12 can be carried out in the configuration illustrated in FIG. 3. Temperature compensation shown in FIG. 13 may also be carried out in the configuration illustrated in FIG. 3.

It should be understood by those skilled in the art that various modifications, combinations, sub-combinations and alterations may occur depending on design requirements and other factors insofar as they are within the scope of the appended claims or the equivalents thereof.

What is claimed is:

1. An image-blur compensating device comprising:
   an optical component configured to compensate blur in an image;
   an actuator configured to drive the optical component;
   a displacement detector configured to detect a position of the optical component changed by the actuator;
   an angular velocity detector configured to detect an angular velocity applied from outside;
   a target displacement calculator configured to calculate a driving amount when the actuator has driven the optical component based on the angular velocity detected by the angular velocity detector and the position detected by the displacement detector, and to compensate the driving amount based on an amount of influence induced by the actuator on the position of the optical component detected by the displacement detector and the calculated driving amount to generate a compensated driving amount; and
   a driver configured to drive the actuator based on the compensated driving amount calculated by the target displacement calculator.

2. An image-blur compensating device according to claim 1, wherein the actuator electromagnetically drives the optical component, and the displacement detector is a sensor detecting an output based on magnetic intensity.

3. An image-blur compensating device according to claim 1, wherein the target displacement calculator calculates, as a result of compensating an amount of influence induced by the actuator on a value of the position detected by the displacement detector, a driving amount of the actuator detected by the displacement detector.

4. An image-blur compensating device according to claim 1, wherein the actuator includes first and second actuators configured to displace the optical component in first and second directions, and the first and second actuators respectively include first and second displacement detectors individually detecting the positions of the optical component displaced by the actuators, and the target displacement calculator compensates an amount of influence induced by the first actuator on the position of the optical component detected by one of the first and second detectors, and an amount of influence induced by the second actuator on the position of the optical component detected by one of the first and second detectors, and then obtains driving amounts of the first and second actuators based on the driving amounts when the first and second actuators have driven the optical component.

5. An image-blur compensating device according to claim 1, wherein the image pickup lens system includes a focus lens and a zoom lens, and the target displacement calculator calculates, as a result of compensating an amount of influence induced by the actuator on the position of the optical component detected by the displacement detector, a driving amount of one of the actuators based at least on one of positions to which one of the focus lens and the zoom lens is adjusted.

6. An image-pickup apparatus comprising:
   an image pickup lens system,
   an optical component configured to compensate blur in an image;
   an imager configured to capture the image via the image pickup lens system;
   an actuator configured to drive the optical component;
   a displacement detector configured to detect a position of the optical component changed by the actuator;
   an angular velocity detector configured to detect an angular velocity applied from outside;
   a target displacement calculator configured to calculate a driving amount when the actuator has driven the optical component based on the angular velocity detected by the angular velocity detector and the position detected by the displacement detector, and to compensate the calculated driving amount based on an amount of influence induced by the actuator on the position of the optical component detected by the displacement detector and the calculated driving amount to generate a compensated driving amount; and
   a driver configured to drive the actuator based on the compensated driving amount calculated by the target displacement calculator.

7. An image-pickup apparatus according to claim 6, wherein the actuator electromagnetically drives the optical component, and the displacement detector is a sensor detecting an output based on magnetic intensity.

8. An image-pickup apparatus according to claim 6, wherein the target displacement calculator calculates, as a result of compensating an amount of influence induced by the actuator on a value of the position detected by the displacement detector, a driving amount of the actuator detected by the displacement detector.

9. An image-pickup apparatus according to claim 6, wherein the actuator includes first and second actuators configured to displace the optical component in first and second directions, and respectively includes two displacement detectors individually detecting displacement amounts displaced by the actuators, and the target displacement calculator compensates an amount of influence induced by the first actuator on the position of the optical component detected by one of the first and second detectors, and an amount of influence induced by the second actuator on the position of the optical component detected by one of the first and second detectors, and then obtains driving amounts of the first and second actuators based on the driving amounts obtained when the first and second actuators have driven the optical component.

10. An image-pickup apparatus according to claim 6, wherein the image pickup lens system includes a focus lens and a zoom lens, and the target displacement calculator calculates, as a result of compensating interference with one of the displacement detectors of the actuators, a driving amount driven by one of the actuators based on at least one of the positions adjusting the focus lens and the zoom lens.

* * * * *